United States Patent
Kraige et al.

(10) Patent No.: US 9,453,854 B2
(45) Date of Patent: Sep. 27, 2016

(54) VIBRATION SENSOR

(71) Applicant: KCF TECHNOLOGIES, INC., State College, PA (US)

(72) Inventors: David R. Kraige, State College, PA (US); Jacob J. Loverich, State College, PA (US); Stephen J. Wenner, Port Matilda, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 47 days.

(21) Appl. No.: 14/192,025

(22) Filed: Feb. 27, 2014

(65) Prior Publication Data

US 2015/0241463 A1 Aug. 27, 2015

(51) Int. Cl.
*G01P 15/097* (2006.01)
*G01P 15/09* (2006.01)
*G01P 15/12* (2006.01)
*G01H 1/00* (2006.01)

(52) U.S. Cl.
CPC ............. *G01P 15/097* (2013.01); *G01H 1/003* (2013.01); *G01P 15/09* (2013.01); *G01P 15/124* (2013.01)

(58) Field of Classification Search
CPC ...... G01P 15/097; G01P 15/09; H02N 2/186
USPC .................... 73/1.82, 649; 213/334; 310/334
See application file for complete search history.

(56) References Cited

U.S. PATENT DOCUMENTS

| 6,357,147 | B1 | 3/2002 | Darley et al. | |
|---|---|---|---|---|
| 6,778,100 | B2* | 8/2004 | Schempf | F17D 3/01 340/870.07 |
| 7,424,403 | B2* | 9/2008 | Robinson | G01H 1/00 340/3.1 |
| 8,217,790 | B2* | 7/2012 | Script | G01P 15/09 200/61.45 M |
| 8,793,081 | B1* | 7/2014 | Loverich | G01L 5/0004 340/683 |
| 2006/0238330 | A1 | 10/2006 | Harman et al. | |
| 2011/0295546 | A1 | 12/2011 | Khazanov | |
| 2012/0319866 | A1* | 12/2012 | Svoen | H04Q 9/00 340/870.39 |
| 2014/0182378 | A1* | 7/2014 | Loverich | H02N 2/186 73/514.29 |
| 2016/0041068 | A1* | 2/2016 | Wascat | G01M 99/005 702/39 |

FOREIGN PATENT DOCUMENTS

WO  2013/095890 A1  6/2013
WO  2014/026755 A2  2/2014

OTHER PUBLICATIONS

Apr. 26, 2016 Search Report issued in European Patent Application No. 15156594.2.

* cited by examiner

*Primary Examiner* — Lisa Caputo
*Assistant Examiner* — Tran M Tran
(74) *Attorney, Agent, or Firm* — Oliff PLC

(57) ABSTRACT

A sensor may include a base, an accelerometer rigidly coupled with the base and centered over said base, a circuit arrangement electrically coupled with the accelerometer, and a battery rigidly held in contact with the circuit arrangement and centered over said accelerometer and said base. The base is configured to be secured to a host structure, and the circuit arrangement is configured to receive signals from the accelerometer.

20 Claims, 5 Drawing Sheets

VIBRATION SENSOR

TECHNICAL FIELD

The present disclosure relates generally to a sensor and, more specifically, to a vibration sensor including a wireless accelerometer.

BACKGROUND

Many industrial facilities and processes are heavily dependent on rotating machines or other machines with cyclic motion, for instance pumps, compressors, fans, motors, engines, etc. Such machines encounter failures in normal operations due to internal wear of parts, breakdown of mounts, loosening of fasteners, etc. A terminal or catastrophic failure of such a machine can be very costly because it may halt a process until the machine can be repaired, or a failure of one part may lead to failures in other parts of the system, incurring more costs. In some applications machine failures may also pose a significant safety hazard. Thus, early detection of impending failure is highly desirable, such that the machine can be maintained or repaired in a proactive manner before a catastrophic failure occurs, rather than repairing reactively after a costly failure has already occurred. Many problems such as bearing degradation, gear failures, imbalances, etc. which may eventually lead to an expensive failure can be diagnosed prior to failure by monitoring the vibration of the machine at one or more points. Therefore it is desirable to instrument high-value or safety-critical machines with vibration sensors which can be monitored periodically to judge the health of the machine and help inform maintenance activities.

Maintenance and inspection requirements often drive the life-cycle cost of components and structures, particularly for fatigue sensitive and operation critical parts. Maintenance activities are often conducted on time intervals that are based on worst case environmental, wear, and loading conditions. However in practice component and structure usage conditions vary and therefore, structural degradation varies between each asset, making failure difficult to predict purely on usage time. Acquisition of health and usage data during use of the component or structure promises to enable tailoring of maintenance activities to each asset and thereby reduce over-conservative maintenance activity. This practice of Condition Based Maintenance (CBM) and Structural Health Monitoring (SHM) is particularly relevant to high-value assets that require expensive and frequent maintenance. In the context of such machines, the application of CBM practices reduces scheduled and unscheduled maintenance, reduces inspection requirements, and extends the life of certain components and subsystems. In the case of structures and dynamic systems, physical sensors are required to generate factual data upon which maintenance decisions are based. In many conventional CBM implementations, sensors are wired to a data aggregator and processing unit. Alternatively a "walk-around" system may be used, in which an operator must take a limited number of sensors from machine to machine to collect periodic measurements. As sensor technology and CBM analysis techniques have improved, sensor wiring and walk-around operation have become major limitations to establishing favorable CBM life-cycle value statements for many applications.

Wireless technologies promises to address this problem by simplifying and reducing the cost of installation, reducing maintenance associated with wiring faults, reducing the need for a technician to visit each monitoring location, and increasing the quantity of data that can be collected. To realize these benefits in most cases, wireless communication must be similar in robustness and function to wired systems, sensor weight including autonomous power supplies must be less than that of a wired sensor, and sensor capability must be similar to their wired counterparts. Satisfying these requirements is a challenge because sensor power supply capability (life or average power delivery) scales directly with weight, and wireless sensor performance, including RF transmission robustness and sensor capability, depends on the energy offered by the power supply.

The fundamental approach to optimally satisfying these requirements seeks to maximize the measurement accuracy of extremely low-power sensor elements such that a wireless accelerometer can be used for a very long period of time with high accuracy in a very small package with a small power source (battery). Novel solutions to these issues are presented in the following disclosure.

SUMMARY OF THE INVENTION

In one aspect of the disclosure, a sensor may include a base, an accelerometer rigidly coupled with the base and centered over said base, a circuit arrangement electrically coupled with the accelerometer, and a battery rigidly held in contact with the circuit arrangement and centered over said accelerometer and said base. The base is configured to be secured to a host structure, and the circuit arrangement is configured to receive signals from the accelerometer and transmit them wirelessly to a remote receiver.

According to some aspects, a sensor may include a base having a bottom portion including a mount. The sensor has a centerline axis extending substantially perpendicular to the bottom portion of the base. A receiving arrangement extends from the bottom portion of the base, and an accelerometer is centered over the base. At least a portion the accelerometer is received by the receiving arrangement. A circuit arrangement is electrically coupled with the accelerometer and configured to receive signals from the accelerometer, and a battery is rigidly held in contact with the circuit arrangement and centered over the accelerometer and the base. The accelerometer is between the bottom portion of the base and the circuit arrangement, and the battery is on an opposite side of the circuit arrangement relative to the accelerometer.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts.

Figure 1A:
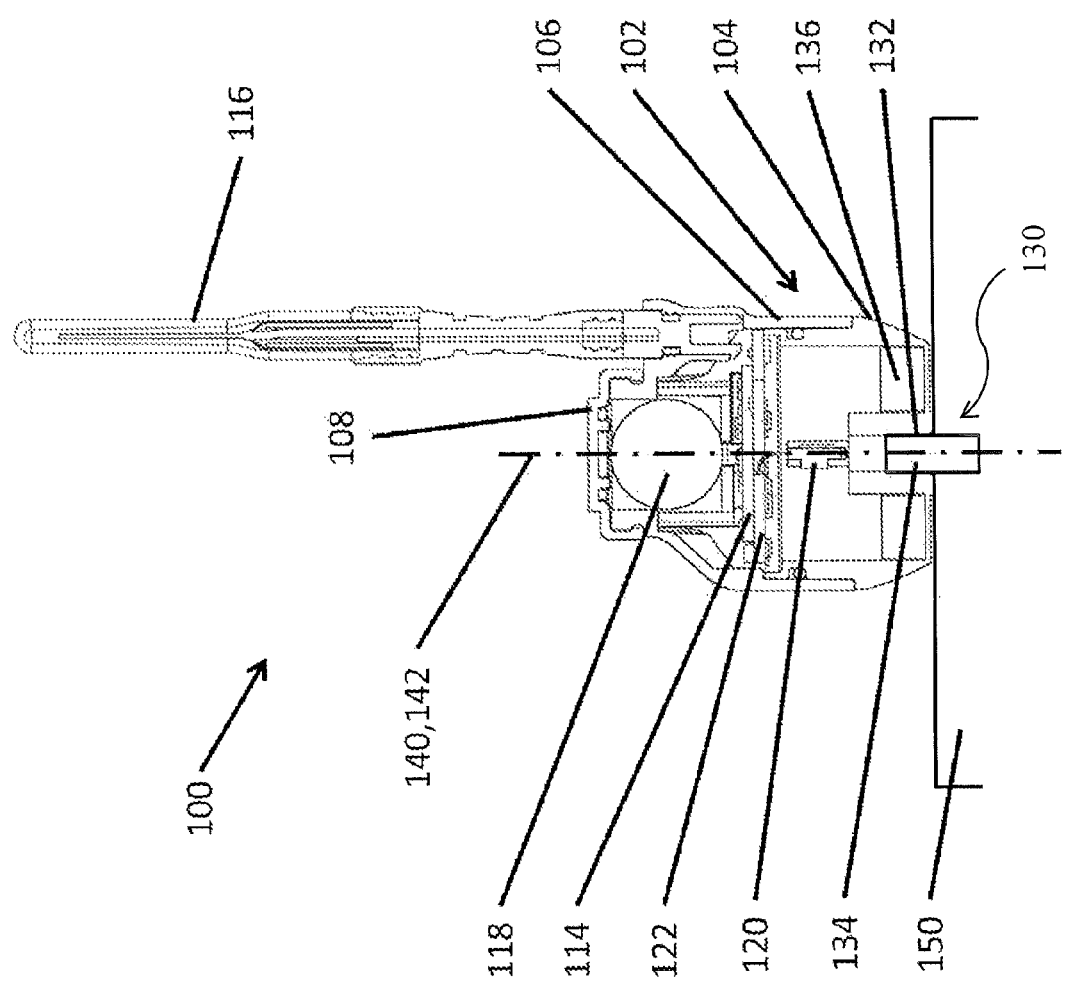
FIG. 1A is a side view of an assembled version of an exemplary sensor in accordance with aspects of the disclosure.
Figure 1B:
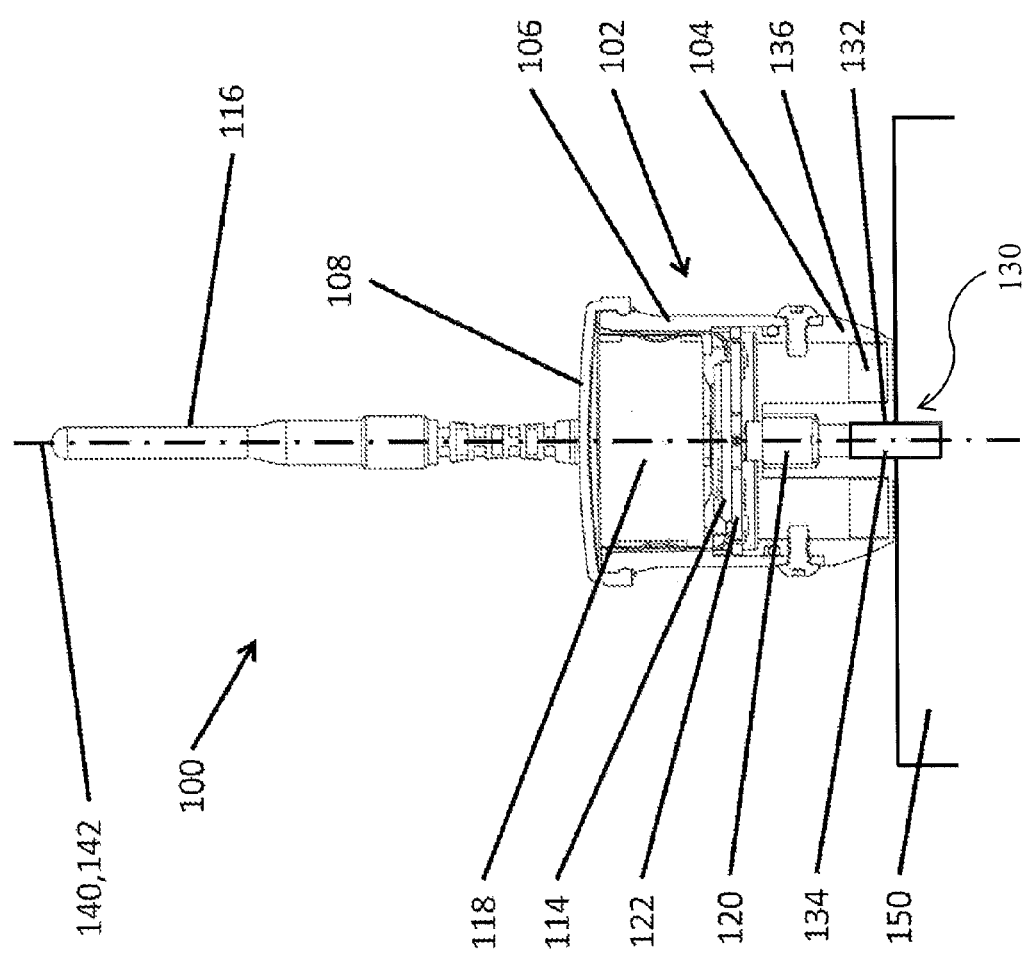
FIG. 1B is a front view of the sensor of FIG. 1A.

FIGS. 1A and 1B illustrate a sensor 100 in accordance with various aspects of the disclosure. The sensor 100 includes a housing 102 that covers and protects a sensing arrangement 110 (discussed in detail below). In some aspects, the housing 102 may include a first portion, or base, 104 and a second portion 106 fixedly coupled with one another. The housing 102 may further include a cover 108 removably coupleable with the second portion 106 of the housing 102.

Figure 2:
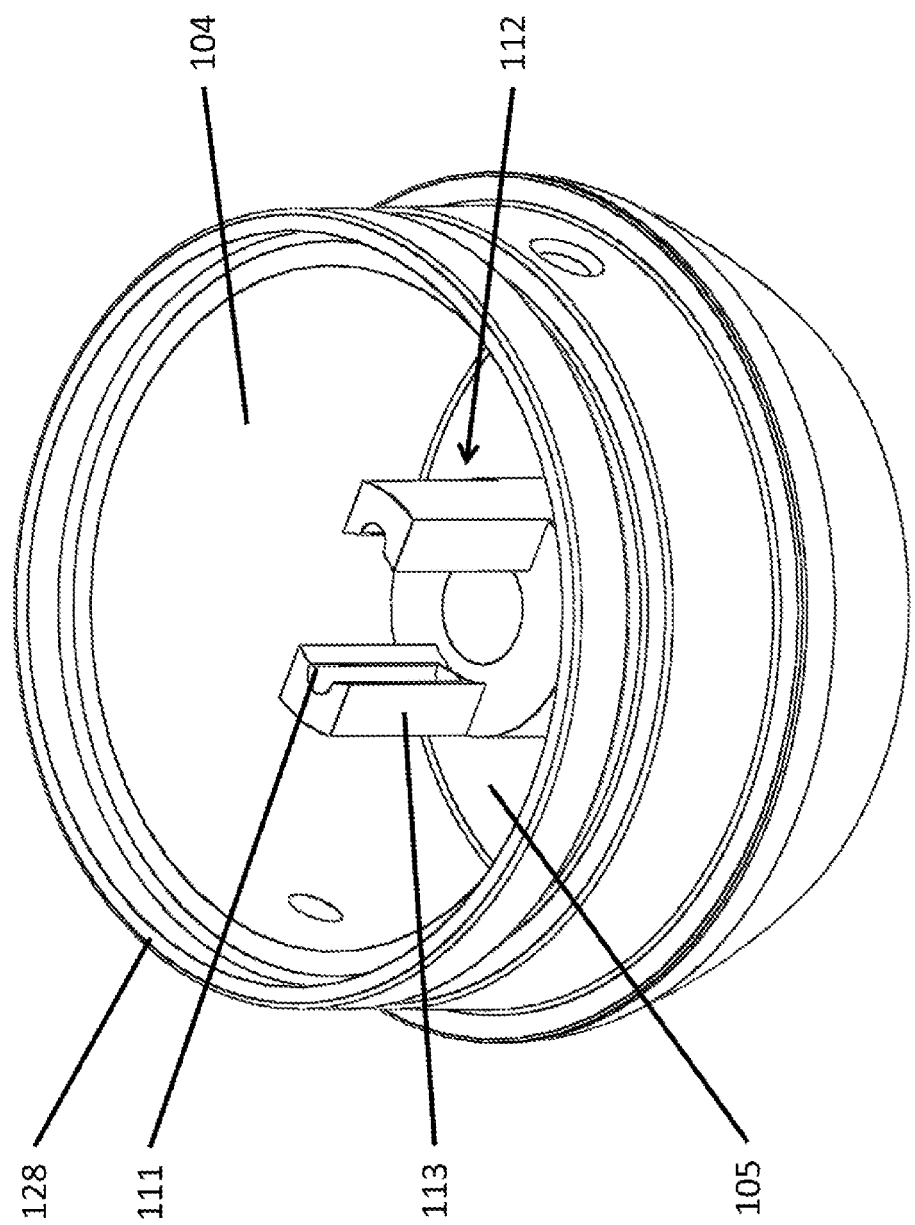
FIG. 2 is a perspective view of a portion of an exemplary housing of the sensor of FIGS. 1A and 1B.

Referring to FIG. 2, in some aspects, the first portion 104 may include a receiving arrangement 112 extending from a bottom 105 of the first portion 104 toward an interior of the housing 102. The receiving arrangement 112 may be configured to receive at least a portion of the sensing arrangement 110. According to some aspects, the first portion 104 of housing 102 may be constructed of a material having a relatively high stiffness and strength so as to protect the sensor and circuitry housed therein. In some aspects, the material of the first portion 104 of housing 102 may be a metal, for example, aluminum or steel, or a composite. It may be desirable in some aspects to maximize the stiffness-to-weight ratio of the first portion 104 of housing 102 in order to effectively transmit vibration from the host structure to the sensor element without significantly affecting the vibration of the host structure.

In addition to the sensing arrangement 110, the sensor 100 may further include a radio 114 (i.e., a wireless transceiver), an antenna 116, and a battery 118. The second portion 106 of the housing 102 may cover and protect the sensing arrangement 110, the radio 114, and the antenna 116. The radio 114 and antenna 116 may be, for example, an RF radio and antenna, respectively. It should be appreciated that the material of the second portion 106 of the housing 102 may be a metal, for example, aluminum or steel, or a composite. In some aspects, the second portion 106 may be fabricated out of a material with a low electromagnetic conductivity such as, for example, plastic or rubber.

The cover 108 can be removed from the second portion 106 of the housing 102 to provide a user with access to an interior compartment of the second portion 106 of the housing 102, which can contain the battery 118. Thus, a user can remove and replace the battery 118 whenever needed. It should be appreciated that the first and second portions 104, 106 and the cover 108 may cooperate to define a weatherproof housing 102 of the sensor 100. For example, the housing 102 may provide a sealed enclosure to prevent water, dust, oil, and the like from penetrating the housing 102. Thus, the sensor 100 can be used in a wide variety of harsh industrial environments and across a range of temperatures, humidity, and other conditions.

According to various aspects, the sensing arrangement 110 may include a sensing element 120 and a circuit board 122. According to various aspects, the sensing element 120 may be an accelerometer such as, for example, an analog micro-electro-mechanical system (MEMS) accelerometer. The circuit board 122 may include a circuit arrangement 126 designed and configured to perform desired signal conditioning. The sensing arrangement 110, the radio 114, and the antenna 116 are electrically coupled with one another so that the sensor 100 can wirelessly transmit data, for example, acceleration data, to a remote receiver (not shown).

Figure 3:
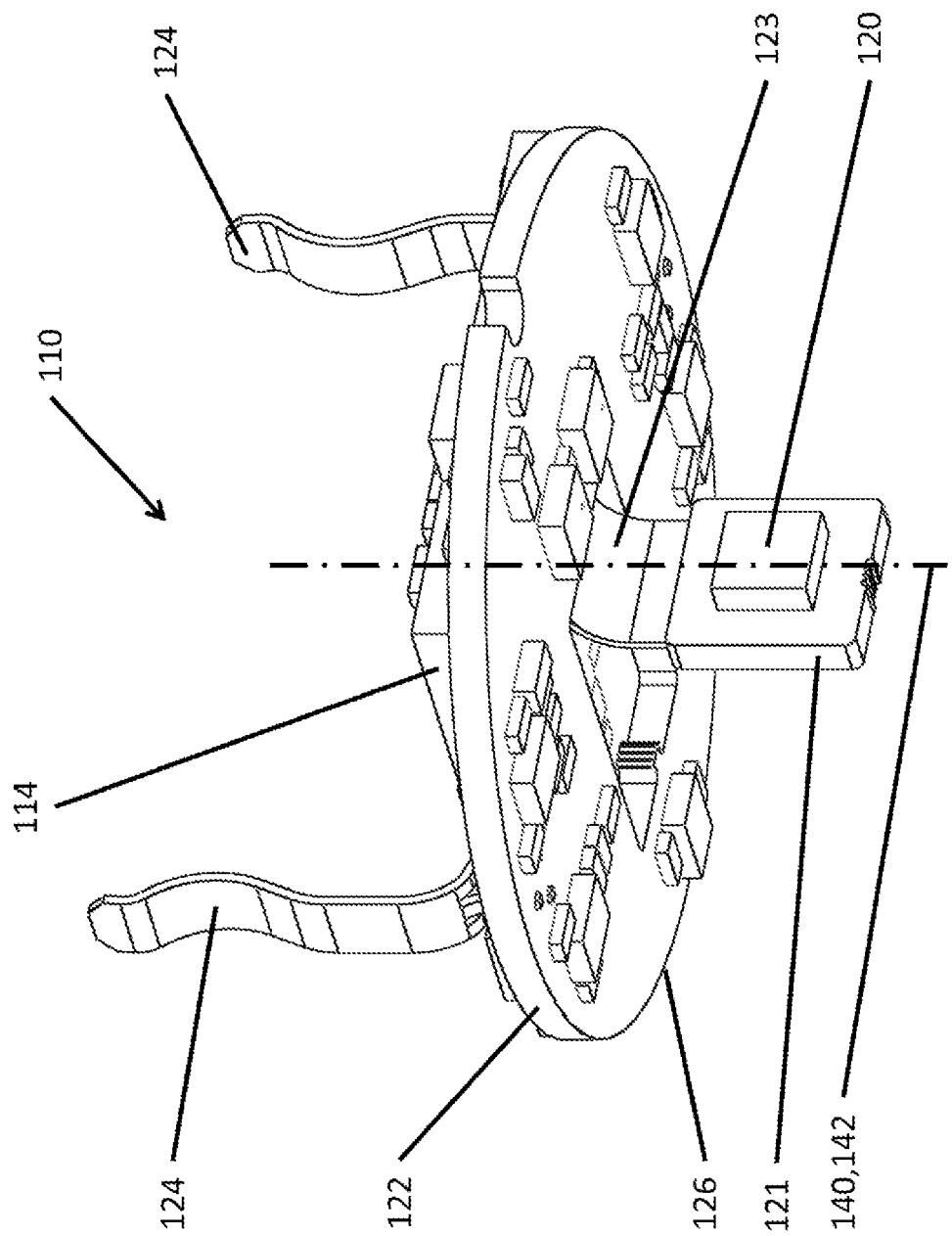
FIG. 3 is a bottom perspective view of exemplary components of the sensor of FIGS. 1A and 1B.
Figure 4:
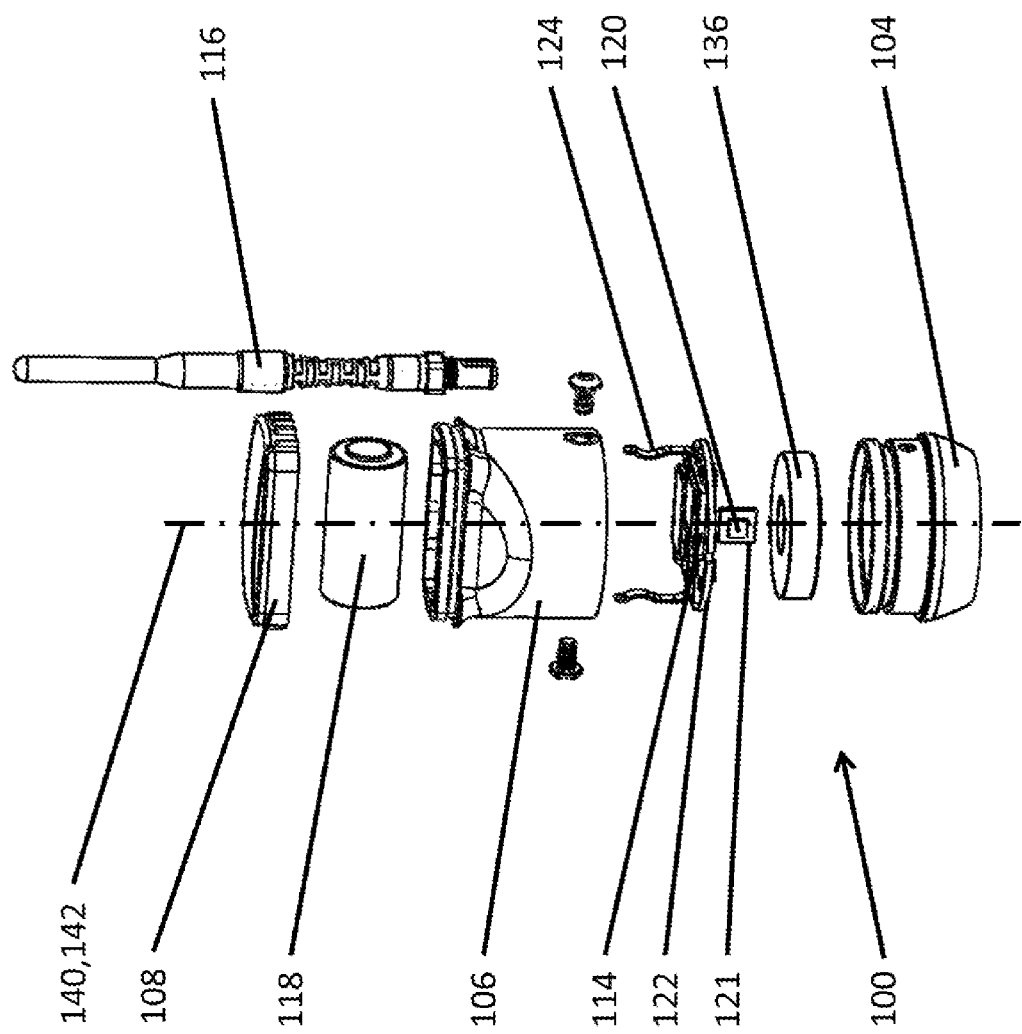
FIG. 4 is an exploded view of the sensor of FIGS. 1A and 1B.

As shown in FIG. 3, the sensor 100 may include a pair of battery terminals 124 electronically coupled with and extending from the circuit board 122. The battery terminals 124 are contained by the housing 102 and configured to rigidly hold the battery 118 in electrical contact with the circuit board 122.

Referring again to FIGS. 1A and 1B, the first portion 104 of the housing 102 includes a mounting arrangement 130. In some aspects, the mounting arrangement 130 may include a threaded bore 132 capable of receiving a threaded member 134, such as for example, a threaded screw or stud. It should be appreciated that the threaded member 134 can be fixedly coupled with a host structure 150, thereby enabling the sensor 100 to be coupled with the host structure 150 by coupling the threaded bore 132 with the threaded member 134.

In some aspects, the first portion 104 of the housing 102 may contain one or more magnets 136 at the bottom 105 of the first portion 104 of the housing 102. The magnets 136 may be of sufficient magnetic strength to couple the sensor 100 with the host structure 150, for example, a host structure made of a ferrous metal. Thus, in some embodiments, the mounting arrangement 130 can include the magnets 136, alone or in combination with the threaded bore 132/threaded member 134. It should be appreciated that in some aspects, the sensor 100 may be coupled with the host structure 150 with an epoxy or any other adhesive of sufficient strength. Thus, in some embodiments, the mounting arrangement can include an epoxy or any other adhesive.

The sensor 100 has a centerline 140 extending along a longitudinal dimension of the housing 102. The centerline 140 is substantially centered relative to a plane transverse to the longitudinal dimension. For example, if the housing assumes a generally cylindrical configuration, the centerline 140 would extend along a length of the housing and the transverse plane would extend in a radial direction.

As illustrated, the mounting arrangement 130 is substantially centered relative to the centerline 140 at the bottom 105 of the first portion 104 of the housing 102. For example, in some aspects, the threaded bore 132 can be centered at the centerline 140, and, in some aspects, the magnet 136 is centered about the centerline 140. The centered position of the magnet 136 can be determined by an interior diameter of the first portion 104 of the housing 102 and/or by the receiving arrangement 112 being centered about the centerline 140.

The circuit board 122 and the battery 118 are also substantially centered over the bottom 105 of the first portion 104 of the housing 102 relative to the centerline 140. For example, as shown in FIG. 2, the first portion 104 of the housing 102 may include a shoulder 128 on which the circuit board 122 may rest. If the circuit board 122 is configured to rest on the shoulder 128 about the periphery of the housing 102, the circuit board 122 would be centered about the centerline 140. The battery terminals 124 may can be arranged to extend from the circuit board 122 such that when the battery 118 is rigidly held by the terminals 124, the battery 118 extends in a direction transverse to and centered relative to the centerline 140. For example, if the battery 118 is cylindrical, a longitudinal and radial center of the battery 118 is substantially centered on the centerline 140. Although such a cylindrical battery would not be symmetrical for 360° in the transverse dimension, the battery's center of mass would be located along the centerline 140 of the sensor 100.

As best illustrated in FIG. 3, the sensing element 120 has a main axis 142, which is aligned substantially along the centerline 140 of the sensor 100. The sensing element 120 may be substantially planar and extends in the longitudinal dimension of the sensor 100. It should be appreciated that the arrangement of the sensing element 120 in the longitudinal dimension may provide more accurate and/or more consistent measurements of vibration of the host structure 150 because the sensing element 120 may provide more accurate and/or more consistent measurements in the plane of the sensing element 120, as opposed to out of the plane (e.g., if the planar sensing element 120 were to extend transverse to the centerline 140).

In addition, since most of the components of the sensor 100, and particularly the heaviest components, are centered about centerline 140, the overall center of mass of the sensor 100 is aligned substantially along the centerline of the sensor 100.

It should be appreciated that the mounting of the sensor 100 to the host structure 150 and the balance of the sensor 100 determine the degree of accuracy and consistency of vibration data. Sensors according to the disclosure are designed with the mounting arrangement 130, the sensing element 120 and its main axis 142, and the overall center of mass of the sensor 100 all aligned along the centerline 140 of the sensor 100. Because the center of mass and the measurement point (i.e., the sensing element 120) are centered directly over the center of the mounting arrangement 130, the sensor 100 is prevented from having a tendency to rock laterally when experiencing vertical vibration, or experience other motion which would influence and reduce the accuracy of the vibration measurement.

In some aspects, it may be desirable to have multiple different sensor types that can all use the same radio, thus only requiring certification of one radio for use with the various sensors. Accordingly, the radio 114 may be constructed as its own circuit board separate from the circuit board 122. The radio 114 can then be attached to various different sensors. The connection between the two boards can be achieved using land grid array (LGA) soldering rather than using any type of connector, since a connector would add size and cost and possibly fatigue and fail over time due to prolonged vibration. The LGA assembly process provides a common, compact interface that can be utilized across a variety of sensors, thereby allowing changes to either the radio or the sensor circuit without the requirement of changing both.

According to some exemplary embodiments, it may be desirable to make the sensor 100 as compact as possible, while having the overall center of mass of the sensor 100 aligned with a center of the mounting arrangement 130 and the sensing element 120 and its main axis 142. In such embodiments, the sensing element 120 may be disposed on a board 121 oriented in a vertical plane, whereas the remainder, for example, a majority, of the sensing arrangement (e.g., the circuit board 122) and the radio 114 may be in a horizontal plane. In such an arrangement, the battery 118, which is a major contributor to the overall weight of the sensor 100, can be rigidly held by the terminals 124 above the circuit board 122 and the radio 114 at a position where the mass of the battery 118 is substantially centered relative to the centerline 140 and easily accessible by a removing the cover 108 from the second portion 103 of the housing 102.

In some aspects, in order to electronically connect the vertically-oriented sensing element 120 and board 121 with the horizontally-oriented circuit board 122, both boards 121, 122 can be manufactured as a single component with a flexible layer 123. After the circuit board is printed and populated, a portion 121 of the board can be cut away from the main portion 122 and allowed to flex 90 degrees via the flexible layer 123, thereby creating the two circuit boards 121, 122 oriented perpendicular to one another with flexible circuit traces connecting the two boards. As shown in FIG. 2, the receiving arrangement 112 may be constructed as a pair of arms 113 extending from the bottom 105 of the first portion 104 toward an interior of the housing 102. The arms 113 may include slots 111 structured and arranged to receive and hold the sensing element 120 in the vertical orientation.

In order to maintain the flexed sensor board 121 and sensing element 120 rigidly in place and to protect them from environmental exposure, all or at least a portion of the entire interior volume of the first portion 104 of the sensor housing 102 may be potted using, for example, a rigid two-part epoxy. Such potting can firmly connect the sensing element 120 to the base 104 of the housing 102 so that the sensing element 120 has a direct, rigid mechanical connection to the host machine 150 being monitored, via the mounting arrangement 130, so that the vibration level of the host machine 150 can be accurately measured. The potting can also rigidly maintain the internal magnet 136 in place and seal the bottom 105 of the first portion 104 of the sensor 100. The potting also encapsulates the sensing element 120, preventing contamination or damage from foreign matter and also preventing the sensor from exchanging gases through its housing, which may cause the sensor's accuracy to slowly degrade over long periods of time.

It should be appreciated that in some aspects, the two circuit boards 121, 122 can be connected by a right angle connector. However, right angle connectors can be more expensive, larger, and more likely to fail than a flex connector, thereby potentially leading to a larger profile sensor with lower reliability. Placing both of the two circuit boards 121, 122 in a vertical orientation would lead to an even larger profile sensor as the battery would have to be displaced to a new area.

It should be appreciated that, in one exemplary embodiment, the sensing element may comprise a digital MEMS accelerometer, which includes analog-to-digital conversion and signal conditioning in one IC chip. In this case the digital accelerometer would be wired directly to a master controller through a communication BUS such as SPI or I2C.

It should be appreciated that the circuit arrangement may include a master controller, such that the radio, the antenna, and the master controller comprise a wireless communication part of the sensor 100. The wireless communication part supplies data from the master controller to a remote wireless data aggregator (not shown). It may also serve as a means to maintain remote control and monitoring of the sensor node.

As discussed above, the radio 114 is connected to the antenna 116, which is used to optimally project and receive radio signals. The antenna 116 may be located remotely to the circuit arrangement 126 or sensor housing 102. The antenna 116 can be designed as a subsystem or element in the circuit arrangement 126. The antenna 116 may be a patch, chip, PCB antenna, or the like. In some embodiments, the antenna 116 may be located within but near the exterior of the sensor and with the greatest distance away from the large metal objects in the sensor 100.

In order to minimize the sensor size and weight, the total system energy budget may be minimized at all levels including the acceleration measurement. MEMS accelerometers can be implemented to exhibit ultra-low power operation however the current commercially available MEMS accelerometers have limited bandwidth and noise floor which may preclude uses for applications requiring very high fidelity measurement. If a MEMS accelerometer performance is acceptable, then the accelerometer can be mounted to the circuit board, which is centered over the base.

Piezoelectric accelerometers are capable of performing wide bandwidth and high resolution measurements. However, acceleration measurement using traditional piezoelectric accelerometers can consume significant power and therefore the particular implementation of the sensor is important. Integrated charge amplifiers are generally used with piezoelectric accelerometers because they enable use of long wire connections between the accelerometer and a data acquisition system that are protected to some degree from external EMI. In wireless accelerometers, the wire length from the piezoelectric element to the microprocessor analog to digital converter can be short and therefore the integrated charge amplifier can be eliminated or redesigned for low power operation. To shorten the wire length a piezoelectric accelerometer and the circuit should be located adjacent to one another. Electrical connection pins from an accelerometer 120 such as PCB Piezotronics' T-05 Embedded accelerometer can be soldered directly to the circuit board 121. Simple signal conditioning including filters and amplifiers can be implemented on the circuit board 122 instead of using a piezoelectric accelerometer integrated charge amplifier.

Sensors in accordance with this disclosure may find particular utility with regard to industrial machine monitoring and condition-based maintenance, but it should be appreciated that such sensors have many other applications. As one example of use, the wireless vibration sensor 100 may be temporarily or permanently mounted to a particular point on a host machine 150. The sensor 150 then periodically or continuously measures the vibration of the machine at that point and wirelessly transmits the data to a receiver at a central location so that the data can be monitored. Monitoring can be done solely by an operator, or software alarms can be set up to alert an operator in the event of exceedances or fault conditions. In this manner, a large number of monitoring points can all be monitored from one central location without the need to repeatedly visit each machine in a facility and manually measure its vibration in a walk-around fashion, and without the need to run wires to each machine.

From the foregoing, it will be appreciated that, although specific embodiments have been described herein for purposes of illustration, various modifications or variations may be made to the disclosed vibration sensor without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A sensor, comprising:
   a housing having a longitudinal dimension and a centerline extending in a direction of the longitudinal dimension the centerline being centered in a plane transverse to the longitudinal dimension, the housing including a base configured to be secured to a host structure;
   an accelerometer mechanically coupled with the base and centered over the centerline in the plane transverse to the longitudinal dimension;
   a circuit arrangement electrically coupled with the accelerometer, the circuit arrangement being configured to receive signals from the accelerometer; and
   a battery electrically coupled with the circuit arrangement, the battery having a center of mass disposed along the centerline,
   wherein an overall center of mass of the sensor is disposed along the centerline.

2. The sensor of claim 1, wherein the accelerometer has a planar configuration extending in the direction of the longitudinal dimension and lying in a plane of vibration that extends in the direction of the longitudinal dimension.

3. The sensor of claim 1, wherein the circuit arrangement includes a circuit board mounted substantially parallel relative to a bottom portion of the base and substantially centered along the centerline.

4. The sensor of claim 1, further comprising a wireless transceiver on the circuit arrangement.

5. The sensor of claim 1, further comprising an antenna coupled with the circuit arrangement, the antenna being configured to wirelessly transmit data from the sensor and receive data or commands.

6. The sensor of claim 1, wherein the accelerometer includes a piezoelectric element for sensing.

7. The sensor of claim 1, wherein the accelerometer comprises a micro-electrical mechanical semiconductor (MEMS) component.

8. The sensor of claim 1, wherein the base is configured to receive a mounting member associated with a host structure such that the accelerometer, the overall center of mass, and the mounting member are aligned along the centerline.

9. The sensor of claim 1, wherein the base includes a magnet for attaching the sensor to a metallic host structure.

10. The sensor of claim 1, wherein an interior volume of the base is potted such that the accelerometer is held firmly relative to the base.

11. A sensor, comprising:
    a housing having a longitudinal dimension and a centerline extending in a direction of the longitudinal dimension, the centerline being centered in a plane transverse to the longitudinal dimension, the housing including a base having a mount configured to receive a mounting member associated with a host structure:
    a pair of arms extending from the base in the direction of the longitudinal dimension toward an interior of the housing, each of the pair, of arms including a slot extending in the direction of the longitudinal dimension;
    an accelerometer having a planar configuration extending in the direction of the longitudinal dimension, at least a portion the accelerometer being received by the slots of the pair of arms such that accelerometer is centered over the centerline in the plane transverse to the longitudinal dimension;
    a first circuit board having a circuit arrangement thereon, the first circuit board having a planar configuration extending transverse to the longitudinal dimension;
    a second circuit board electrically coupled with the accelerometer and the first circuit board, the second circuit board having a planar configuration extending in the longitudinal dimension of the housing, the accelerometer being disposed on the second circuit board between the base and the circuit arrangement, the circuit arrangement being configured to receive signals from the accelerometer, and;
    a battery held by the first circuit board in electrical contact with the circuit arrangement, the battery having a center of mass disposed along the centerline, the battery being on an opposite side of the first circuit board relative to the accelerometer in the direction of the longitudinal dimension.

12. The sensor of claim 11, wherein the planar configuration of the accelerometer lies in a plane of vibration that extends in the direction of the longitudinal dimension.

13. The sensor of claim 11, further comprising a wireless transceiver on the circuit arrangement.

14. The sensor of claim 11, further comprising an antenna coupled with the circuit arrangement, the antenna being configured to wirelessly transmit data from the sensor and receive data or commands.

15. The sensor of claim 11, wherein the accelerometer includes a piezoelectric element for sensing.

16. The sensor of claim 11, wherein the accelerometer comprises a micro-electrical mechanical semiconductor (MEMS) component.

17. The sensor of claim 11, wherein an overall center of mass of the sensor is disposed along the centerline.

18. The sensor of claim 11, wherein the base includes a magnet for attaching the sensor to a metallic host structure.

19. The sensor of claim 11, wherein an interior volume of the base is potted such that the accelerometer is held firmly relative to the base.

20. The sensor of claim 17, wherein the base is configured to receive a mounting member associated with a host structure such that the accelerometer, the overall center of mass, and the mounting member are aligned along the centerline.

* * * * *